United States Patent [19]

Siegel

[11] Patent Number: 5,353,596

[45] Date of Patent: Oct. 11, 1994

[54] LOW TEMPERATURE HEAT ENGINE

[76] Inventor: Israel Siegel, 2980 Point East Dr., Apt. D-612, N. Miami Beach, Fla. 33160

[21] Appl. No.: 20,791

[22] Filed: Feb. 22, 1993

[51] Int. Cl.$^5$ .............................................. F01C 5/02
[52] U.S. Cl. ......................................... 60/531; 60/669
[58] Field of Search ........................... 60/531, 669, 516

[56] References Cited

U.S. PATENT DOCUMENTS

| | | | |
|---|---|---|---|
| 1,289,435 | 12/1918 | Fulton | 60/531 |
| 3,841,097 | 10/1974 | Siegel | 60/517 |
| 4,036,017 | 7/1977 | Siegel | 60/497 |
| 4,036,019 | 7/1977 | Siegel | 60/531 |
| 4,041,705 | 8/1977 | Siegel | 60/497 |
| 4,180,982 | 1/1980 | Siegel | 60/531 |
| 4,341,075 | 7/1982 | Blacklund | 60/531 |
| 4,390,325 | 6/1983 | Elo et al. | 60/531 |

*Primary Examiner*—Richard R. Cole
*Assistant Examiner*—L. Heyman

[57] ABSTRACT

A relatively hot and a relatively cold chamber are air evacuated and contain a low boiling point liquid. The temperature differential between the chambers results in a vapor pressure differential between the chambers. The vapor pressures inside the chambers transmit a vector force to a movable wall of each of the chambers. The vapor pressures in the chambers are equalized intermittently by an intermittent communication between the chambers. The chambers are positioned relative to each other so that the movable wall of one chamber transmits an opposing vector force to the movable wall of the other chamber. This brings the walls to a position which is determined by the the resultant of the opposing vector forces upon the walls. When the resultant of the vector forces changes during the intermittent communication between the chambers the movable walls change their position. The movements of the walls between different positions perform useful work through standard mechanical links to a force receiving means.

8 Claims, 2 Drawing Sheets

LOW TEMPERATURE HEAT ENGINE

OBJECTIVES AND BACKGROUND

The invention relates to low temperature vapor engines and in particular to improvements in vapor differential temperature engines which I have previously described in U.S. Pat. Nos. 3,841,097, 4,036,017, 4,036,019, 4,041,705, and 4,180,982.

A vapor engine functions to convert heat energy to mechanical energy through the flow of vapor from a relatively hot heat source to a relatively cold heat sink. In standard vapor engines the heat sources that can be practically utilized are above ambient temperatures. In contrast to standard vapor engines the differential temperature can be powered by heat sources of ambient temperatures. The requirement for relatively high temperature in standard heat engines is caused in part by the fact that the generation of vapor must overcome the resistance of atmospheric air. Differential temperature engines have not encountered atmospheric resistance because engine generates vapor in a chamber from which the air has been evacuated.

One shortcoming of an engine which operates in a chamber containing a vacuum is the fact that the force generated in the chamber containing the vacuum must often be transmitted to a force receiving means outside of the chamber. Standard mechanical links between the moving member inside the air evacuated chamber and an object outside of the chamber requires a perforation of the walls enclosing the air evacuated chamber. This increases the chances of an air leak from the atmosphere into the air evacuated chambers. Magnetic transmission through intact walls has been used. This is limited by the fact that a close proximity between the inside and outside magnetic interacting bodies must be maintained for an effective magnetic transmission. Flexible surfaces have been used, under certain conditions, to transmit movement from from the inside of a chamber to force receiving means outside of the chamber. This mode of transmission has, however, been limited by the fact that the flexible walls can only transmit forces which exceed atmospheric pressures. The main objective of the present invention is to provide a differential temperature engine with a flexible wall transmission mechanism that can can transmit forces which are both below and above atmospheric pressures from a chamber containing an air vacuum to a force receiving means in the atmosphere.

SUMMARY

The engine consists of a relatively hot and a relatively cold chamber, containing a low boiling point liquid under an air vacuum. The relatively hot chamber functions as an evaporator chamber. The relatively cold chamber functions as a condenser chamber. The temperature differential between the chambers causes the vapor pressure in the relatively hot chamber to exceed the vapor pressure in the relatively cold chamber. A conduit communicates between the relatively hot and the relatively cold chambers. Opening and closing means which are operatively associated with the moving walls are provided to open and close the communication between the chambers. Each chamber contains a flexible bellows wall, which expands or contracts in response to the vapor pressures in its chamber. The chambers are positioned relative to each other in a way which places the movable walls of the chambers opposite each other and facing each other. The distance between the chambers is fixed to provide space for the movements of the flexible walls between the chambers. The movable walls of the two chambers are attached to each other so that each movable wall transmits its vector force and movements to the other movable wall. When the pressure in a chamber is below atmospheric pressure the movable wall of the chamber exerts a pulling vector force on the other wall. When the pressure in a chamber is above atmospheric pressure the movable wall of the chamber exerts a pushing vector force on the other wall. When the vapor pressures in the chambers become equal, as the result of the opening of the communication between the chambers, the walls settle in a position which is intermediate between the chambers. When a vapor pressure differential between the chambers is regenerated the walls are pulled or pushed towards the chamber with the lower pressure. The reciprocating movements of the walls between different positions are adapted to perform useful work outside of the air evacuated chambers.

DETAILED DESCRIPTION

Figure 1:
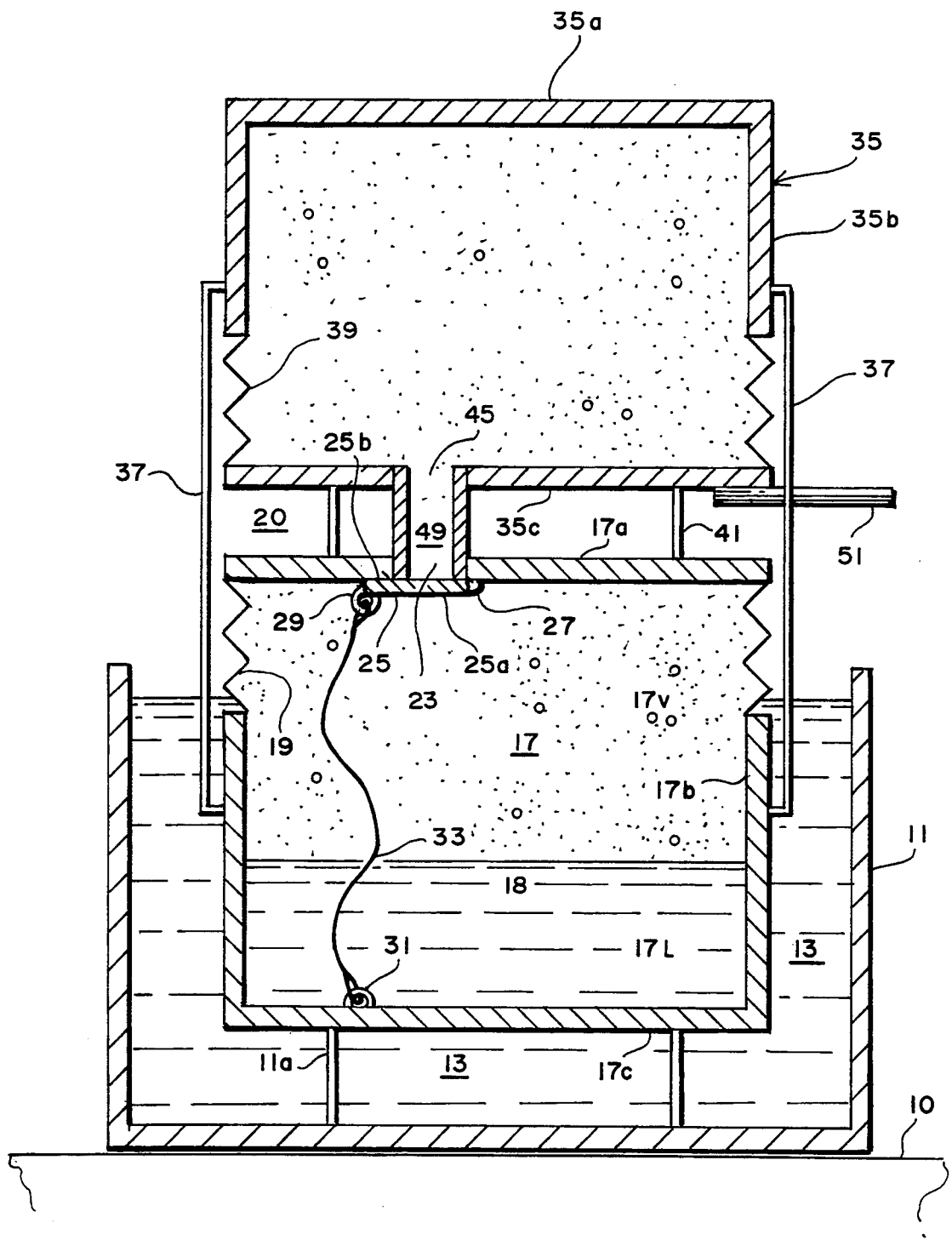
FIG. 1 is a cross-sectional view of a low temperature-low pressure engine in which the condenser chamber is placed at a higher level than the evaporator chamber.

As shown in FIG. 1 a water tank 11 is present on roof 10. The tank is adapted to receive hot water 13, which has been heated by standard solar flat plate collectors (not shown). The tank accumulates solar heated water and thus serves as a storage device for solar energy. To that end the tank may be coated with an insulating material (not shown) to prevent the loss of heat from the tank.

Immersed in the hot water 13 of the solar storage tank 11 is a chamber 17. The chamber rests upon rods 11a which extend from the bottom wall of tank 11. The chamber functions as an evaporator chamber as will be described. The chamber contains a top wall 17a, side walls 17b, and a bottom wall 17c. Top wall 17a is connected to the circumscribing side walls 17b by means of an expandable flexible bellows joint 19 so that wall 17a can move up and down in a reciprocating manner. The size and number of the folds in the bellows are such that the bellows allows a sufficient distance of travel of top wall 17a. The natural bias of the bellows' flexibility keeps the bellows in a folded position. The walls of chamber 17 are made of good heat conducting materials, such as copper, to allow for maximal transfer of heat from the walls to the outside environment. Means such as surface extensions (not shown) to increase the area of the heat exchange surfaces may be used. The immersion of chamber 17 in water 13 is such that the top of bellows 19 is present outside of water 13. Present inside chamber 17 is a low boiling point liquid 18, such as water under an air vacuum. The liquid level divides evaporator chamber 17 into a liquid chamber portion 17l and a vapor chamber portion 17v.

Present above chamber 17 is a chamber 35. The chamber act as a condenser chamber, as will be described. The chamber contains a top wall 35a, side walls 35b, and a bottom wall 35c. Bottom wall 35c is connected to the circumscribing side walls 35b by means of an expandable flexible bellows joint 39 so that the wall can be moved up and down in reciprocating manner. The size and number of the folds in bellows 39 and the spring force of the bellows are similar to those of bellows 19. The walls of chamber 35 are made of good heat conducting materials, such as copper, to allow for maximal transfer of heat from the walls to the outside environment. Means such as surface extensions (not shown) to increase the area of the heat exchange surfaces may be used. Present between walls 17a and 35c are rods 41. The rods are permanently attached to walls 17a and 35c, and create an insulating air space 20 between the chambers. The rods likewise transmit a vector force from one wall portion to another, as will be explained. Chambers 17 and 35 are kept at a predetermined fixed distance from each other by rods 37 which are are attached to the outside surfaces of the side walls of chambers 17 and 35. The distance between the chambers is such that each of bellows 19 and 39 are pulled to about half of their expansion potential. This allows an equal up and down distance of travel by movable walls 19 and 39 between the chambers. The arrangement is such that, when the walls travel upward bellows 19 expands and bellows 39 contracts. When the walls travel downward bellows 19 contracts and bellows 39 expands. Attached to the outer surface of wall 35c is rod 51. The rod is connected to a force receiving means (not shown), by a standard mechanical linkage (not shown), for the production of useful work.

Present between walls 17a and 35c is a tube 49. The tube penetrates into the chambers 17 and 35 through walls 17a and 35c. The junctions of the tube with the walls are sealed with solder to prevent any leak through the walls. The tube communicates with the bottom of chamber 17 through a top open end 23 of the tube, and with the top of chamber 35 through a bottom open end 45 of the tube.

Present on the bottom of open end 23 of tube 49 is cover 25. The cover is in the form of a small flat square designed to cover top end 23 when the cover is in a horizontal position. Side 25a of the cover is attached to the margins of opening 23 by means of a flexible hinge 27. The hinge allows cover 25 to swing from a horizontal to a vertical position. When the cover is horizontal it covers opening 23 and it blocks any passage through opening 23. When cover 25 is oblique or vertical opening 23 is not obstructed and allows passage of vapor out of container 17. The natural bias of flexible hinge 27 is such, that when there is no outside pressure upon cover 25, the inherent spring force of hinge 27 brings cover 25 to a horizontal position. This blocks opening 23, and any passage through conduit 49. The top surface of cover 25 may be lined with a rubber layer (not shown) to help seal opening 23 when cover 25 is horizontal and presses against the lips of opening 23.

Attached to the bottom surface of cover 25, on side 25b which is opposite to side 25a, is a metal loop 29. Attached to the inside surface of bottom wall 17c of chamber 17 is another metal loop 31. The arrangement is that the top loop 31 is positioned vertically opposite the lower loop 29. A cable 33 is tied to to loops 29 and 31. The length of the cable is such that when wall 17a is in its low operational position cable 33 is longer than the distance between cover 25 and top wall 17a. The slack allows the cable to travel away from wall 17c together with wall 17a. When wall 17a is in its bottom position of travel the length of cable 33 is smaller than the distance between cover 25 and wall 17c. This determines the distance of travel of movable walls 17a and 35c, as will be described.

The operation of the engine is as follows. Liquid 18 evaporates in the chambers and exerts a vapor pressure upon the inside walls of the chambers. Since the force follows the path of least resistance the vapors exert a downward force upon movable wall 35c, and a upward force upon movable wall 17a. In contrast, the atmosphere exerts an upward pressure on wall 35c and an downward pressure upon wall 17a. The resultant vector force upon each wall will be equal to the outside atmospheric force upon the wall minus the opposing inside vapor force upon the wall. When the vapor pressure in the chambers is lower than atmospheric pressure the resultant forces will push movable wall 35c upward, and movable wall 17a downward. The walls will transmit these opposing resultant forces to each other through rods 41. Thus, each wall will be subjected to a pushing force by the outside atmosphere, and a pulling force in the opposite direction by its adjacent wall. When tube 49 is open or when the temperatures in the chambers are equal to each other the vapor pressures in the chambers are equal to each other. The resultant downward push upon each wall is then equal to the opposing pulling force by its adjacent wall. The forces upon the walls will then cancel each other. The positions of walls 35c and 17a will then be determined primarily by the inherent flexibility of bellows 19 and 39. The walls will then rest at their initial middle position.

When tube 49 is closed, and when the temperatures in chamber 17 are above those of chamber 35, the upward vapor pressure upon wall 17a becomes higher than the downward vapor pressure upon wall 35c. Consequently, the resultant downward force acting upon wall 17a will be less than the resultant upward force acting upon wall 35c. The atmospheric upward force upon wall 35c will, therefore, not be totally canceled by the downward pulling force by its adjacent wall 17a. This will cause the walls to travel upward. As the walls travel upward bellows 19 expands and bellows 39 folds. This increases the volume of container 17 and decreases the volume of container 35. This causes the vapor in container 17 to expand while the vapor in container 35 is compressed. The expansion of the vapor in container 17 results in a reduction of the vapor pressure in the container. This results in additional evaporation of the low boiling point liquid to restore the pre-expansion vapor pressure. The evaporation of the liquid causes the liquid to lose some of its heat content. The lost heat is restored by a transfer of heat from the heat source through the chamber's walls. This causes an additional evaporation of low boiling point liquid and a restoration of the pre-expansion vapor pressure. The compression of the vapor in the condenser chamber causes a temperature increase of the vapor. This causes the vapor to lose some of its heat content to the environment through the walls of the condenser chamber. Some of the vapor then re-condenses into a liquid, and the relatively low pre-compression vapor pressure in the condenser chamber is restored. Thus a vapor pressure differential between the chambers continues to be present between the expanded evaporator chamber and the compressed condenser chamber. The persistent vapor pressure between the chambers causes a continued upward travel of the movable walls. As wall 17a travels upward it pulls cable 33 upward. The cable does not affect the upward travel of wall 17a, as long as a cable slack is present, and the distance between wall 17c and cover 25 is smaller than the length of the cable. When the distance between the wall and the cover becomes equal to the length of cable 33 the cable will stop the travel of side 25b of but not of side 25a of cover 25. When the upward force upon wall 17a has overcome the spring resistance of hinge 27, side wall 25a travels upward, while side wall 25b remains at the same level. This will cause door 25 to swing open on hinge 27. When this occurs opening 23 is opened and a communication between the vapor phases of chambers 17 and 35 is established through tube 49. This allows the relatively high pressure vapor to leave evaporator chamber 17 to enter the condenser chamber 35 through openings 23 and 45 and tube 49. This will abolish the vapor pressure differential between chambers 17 and 35. The downward and upward forces on wall 35c and 17a will then become equal and cancel each other. The inherent spring force on bellows 19 and 39 vapor will then bring the walls to their initial middle position. When this occurs the slack of cable 33 is re-established. This allows the inherent spring force of hinge 27 to return door 25 to its horizontal position. This will close opening 23, and stop the communication between the chambers. This re-establishes the separation between the vapor phases of chambers 17 and 35. The temperature differential between the chambers regenerates a new vapor pressure differential between the chambers to renew the cycle of operation.

The vapor which has entered chamber 35 loses some of its heat content through the walls of chamber 35 and the relatively cold environment in chamber 35. This will cause the vapor to re-condense into a liquid. The liquid drains back to container 17 by force of gravity through tube 49 during the cycle when opening 23 is not covered.

The reciprocal movements of movable walls 17a and 35c are transmitted to a force receiving means, such as an irrigation pump (not shown), through rod 51.

Figure 2:
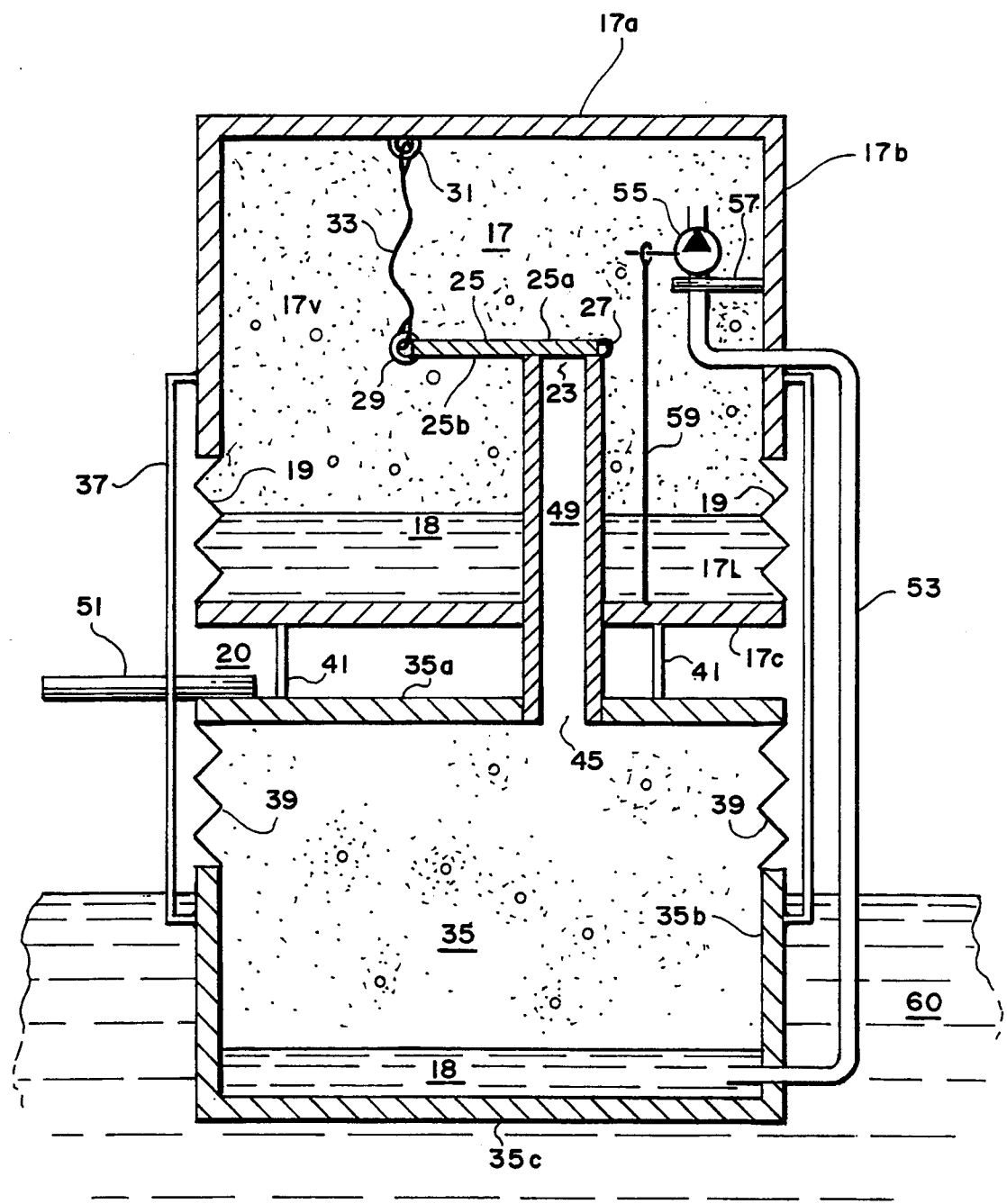
FIG. 2 is a cross-sectional view of a low temperature-low pressure engine in which the condenser chamber is placed at a lower level than the evaporator chamber.

The embodiment of the invention in FIG. 2 is similar to that of FIG. 1, except that the condenser chamber 35 is placed at a lower level than the evaporator chamber 17. A pump has therefore been added as will be described. Components in FIG. 2 which are similar to those of FIG. 1 have been given similar numbers.

As shown in FIG. 2, a condenser chamber 35 is immersed in a body of water 60. The body of water may consist of a lake, river, or an ocean, under ambient conditions in which the water is colder than the air. The chamber contains a top wall 35a, side walls 35b, and a bottom wall 35c. Top wall 35a is connected to the circumscribing side walls 35b by means of an expandable flexible bellows joint 39 so that the wall can be moved up and down in reciprocating manner. The size and number of folds in the bellows determine the potential distance of travel by the moving walls, and will vary with different engines. The spring bias of flexible bellows 39 makes the bellows rest in a folded position. The walls of chamber 35 are made of good heat conducting materials, such as copper, to allow for maximal transfer of heat from the walls to the outside environment. Means such as surface extensions (not shown) to increase the area of the heat exchange surfaces may be used.

Present on top of chamber 35. outside of water 60, is a chamber 17. The chamber functions as an evaporator chamber as will be described. The chamber contains a top wall 17a, side walls 17b, and a bottom wall 17c. Bottom wall 17c is connected to the circumscribing side walls 17b by means of an expandable flexible bellows joint 19 so that the wall can be moved up and down in a reciprocating manner. The size of bellows 19 and its innate spring force is similar to that of bellows 39. The walls of chamber 17 are made of good heat conducting materials, such as copper, to allow for maximal transfer of heat from the walls to the outside environment. Means such as surface extensions (not shown) to increase the area of the heat exchange surfaces may be used. Present between walls 17a and 35c are rods 41. The rods are permanently attached to walls 17a and 35c, and create an insulating air space 20 between the chambers. The rods likewise transmit a vector force from one movable wall to another, as will be explained. Chambers 17 and 35 are kept at a predetermined fixed distance from each other by rods 37 which are are attached to the outside surfaces of the side walls of chambers 17 and 35. The distance between the chambers is such that the bellows are pulled to about half of their expansion potential. This allows an equal up and down distance of travel by the bellows.

Present inside chamber 17 is a low boiling point liquid 18. The liquid level divides evaporator chamber 17 into a liquid chamber portion 17l and a vapor chamber portion 17v.

Present between walls 17a and 35c is a tube 49. The tube penetrates into the chambers 17 and 35 through walls 17a and 35c. The junctions of the tube with the walls are walls are sealed with solder to prevent any leak through the walls. The tube communicates with chamber 17 through a top open end 23 of the tube, and with chamber 35 through a bottom open end 45 of the tube. Tube 49 extends into chamber 17 so that open end 23 is above the level of liquid 18 to prevent the liquid from entering chamber 35 through the tube.

Present on top of open end 23 of tube 49 is cover 25. The cover is in the form of a small flat square designed to cover top end 23 when the cover is in a horizontal position. The cover is attached to the top of tube 49 by means of a flexible hinge 27 present on side 25a of surface 25. The hinge allows cover 25 to swing from a horizontal to a vertical position. When the cover is horizontal it covers opening 23 and it blocks any passage of vapor through opening 23. When cover 25 is oblique or vertical hole 23 is not obstructed and allows passage of vapor out of container 17. The natural bias of flexible hinge 27 is such, that when there is no pressure upon cover 25, the inherent spring force of hinge 27 brings cover 25 to a horizontal position. This blocks opening 23, and prevents any passage of vapor through conduit 49. The top surface of cover 25 may be lined with a rubber layer (not shown) to help seal opening 23 when surface 25 presses against the lips of opening 23.

Attached to the top surface of cover 25, on side 25b which is opposite to side 25a that of hinge 27, is a metal loop 29. Attached to the inside surface of top wall 17a of chamber 17 is another metal loop 31. The arrangement is that the top loop 31 is positioned vertically opposite the lower loop 29. A cable 33 is tied to to loops 29 and 31. The length of the cable is such that when wall 17c is in its top operational position cable 33 is longer than the distance between cover 25 and top wall 17a. The slack allows the cable to travel away from wall 17a together with wall 17c. When wall 17c is in its bottom position, the length of cable 33 is smaller than the distance between cover 25 and 17a. This determines the degree of travel of movable walls 17c and 35a, as will be described.

A tube 53 communicates between the bottom portion of container 35 and the vapor phase 17v of container 17. As seen in the drawing, tube 53 is present mostly outside of the chambers. The tube penetrates the chambers from the outside through the immobile portions of the side walls of the chambers. The junctions of the side walls with tube 53 are sealed by solder in order to prevent a leakage through the walls. A pump 55 is supported by wall extension 57, close to the top opening of tube 53. The pump communicates with tube 53 and transfers liquid from the bottom of container 35 to container 17. The pump may consist of a bellows pump which is powered by the movements of wall 17c. A rod 59 links pump 55 to movable wall 17c and transmits the downward and upward movements of wall 17c to the pump.

Attached to the outside surface of top wall 35a is a horizontal rod 51. The rod moves with wall 35a and transmits its movement through a standard mechanical linkage to a force receiving means (not shown).

The operation of the engine is as follows. Liquid 18 evaporates in the chambers and exerts a vapor pressure upon the inside walls of the chambers. Since the force follows the path of least resistance the vapors exert a downward force upon movable wall 17c, and a upward force upon movable wall 35a. In contrast, the atmosphere exerts an upward pressure on wall 17c and an downward pressure upon wall 35a. When the vapor pressure in the chambers is lower than atmospheric pressure the resultant forces will push movable wall 17c upward, and movable wall 35c downward. The walls will transmit these opposing vector forces to each other through rods 41. Thus, each wall will be subjected to a pushing vector force by the outside atmosphere, and a pulling force in the opposite direction by its adjacent wall. When tube 49 is open, or when the temperatures in the chambers are equal to each other the vapor pressures in the chambers are equal to each other. The resultant downward push upon each wall is then equal to the opposite pulling force by its adjacent wall. The opposing forces upon the walls will then cancel each other. The positions of walls 17c and 35a will then be determined primarily by the equal inherent flexibility of bellows 19 and 39. The walls will then rest at their initial middle position.

When tube 49 is closed, and when the temperatures in chamber 17 are above those of chamber 35, the downward vapor pressure in chamber 17 becomes higher than the upward vapor pressure in chamber 35. Consequently, the individual resultant upward force acting upon wall 17c will be less than the individual resultant downward force acting upon wall 35a. The atmospheric downward force upon wall 35a will, therefore, not be totally canceled by the upward pulling force by its adjacent wall 17c. This will cause the walls to travel downward.

As the walls travel downward bellows 19 expands and bellows 39 folds. This increases the volume of container 17 and decreases the volume of container 35. This causes the vapor in container 17 to expand while the vapor in container 35 is compressed. The expansion of the vapor in container 17 results in a reduction of the vapor pressure in the container. This results in additional evaporation of the low boiling point liquid to restore the pre-expansion vapor pressure. The evaporation of the liquid causes the liquid to lose some of its heat content. The lost heat is restored by a transfer of heat from the heat source through the chamber's walls. This causes an additional evaporation of low boiling point liquid and a restoration of the pre-expansion vapor pressure. The compression of the vapor in the condenser chamber causes a temperature increase of the vapor. This causes the vapor to lose some of its heat content to the environment through the walls of the condenser chamber. Some of the vapor then re-condenses into a liquid, and the relatively low pre-compression vapor pressure in the condenser chamber is restored. Thus a vapor pressure differential between the chambers continues to be present between the expanded evaporator chamber and the compressed condenser chamber. The persistent vapor pressure between the chambers causes a continued downward travel of the movable walls.

As wall 35a travels downward it pulls cable 33 downward. The cable will not affect the downward travel of wall 17c, as long as there is a cable slack and the distance between wall 17a and cover 25 is smaller than the length of the cable. When the distance between the wall and the cover becomes equal to the length of cable 33, the cable will stop the travel of side 25b of but not of side 25a of cover 25. When the downward force upon wall 17c has overcome the spring resistance of hinge 27, side wall 25a travels downward, while side wall 25b remains at the same level. This will cause door 25 to swing open on hinge 27. When this occurs opening 23 is opened and a communication between the vapor phases of chambers 17 and 35 is established through tube 49. This allows the relatively high pressure vapor to leave evaporator chamber 17 to enter the condenser chamber 35 through openings 23 and 45 and tube 49. This will abolish the vapor pressure differential between chambers 17 and 35. The downward and upward forces on wall 17a will become equal and the inherent spring force on bellows 19 and 39 will bring walls 17c 35a to their initial middle position. When this occurs the slack of cable 33 is re-established. This allows the inherent spring force of hinge 27 to return door 25 to its horizontal position. This will close opening 23, and stop the communication between the chambers. This re-establishes the separation between the vapor phases of chambers 17 and 35. The temperature differential between the chambers results in the development of a new vapor pressure differential between the chambers to renew the cycle of operation.

The vapor which has entered chamber 35 loses some of its heat content through the walls of chamber 35 and the relatively cold environment in chamber 35. This will cause the vapor to re-condense into a liquid. The liquid accumulates in the bottom of chamber 35. The movements of wall 17c activate pump 53. The liquid in chamber 35 is then brought back to chamber 17 by the pump to continue the cycle of operation.

The movements of the movable walls are transmitted to a force receiving means (not shown) through rod 51 to produce useful work.

It is understood that variations in the engine may be made without departing from the essence of the invention as defined in the claims. For example, the chambers may be placed side by side instead of on top of each other. The movable walls may consist of a portion of the side walls instead of the bottom or top walls. The embodiments of the invention illustrated in FIGS. 1 and 2 may be combined to produce an engine in which each chamber can function both as a condenser and an evaporator chamber. A variety of standard valve may be used to open and close the communication between the chambers. A variety of means may be used to obtain, or enhance, a temperature differential between chambers. These include a selective wetting of the relatively cold chamber to cool the chamber by surface water evaporation. The evaporator chamber may be heated by direct solar radiation and placed in a transparent tent to selectively heat the chamber by a green house effect. Other sources of low temperature heat may be used to obtain a temperature differential between the chambers. For example, the engine may use automotive waste heat, or waste heat generated by electric production plants.

It is understood that the embodiment outlined in FIG. 1 and FIG. 2 may be used not only when the inside pressures are below atmospheric pressures but also when the inside pressures in one or the two chambers are above atmospheric pressures. When the vapor pressure inside a chamber exceeds atmospheric pressure the resultant vector force will be equal to the vapor pressure force minus the atmospheric force. This will result in a pushing force upon the attached adjacent wall, instead of a pulling force.

The forces developed by the engine depend upon a variety of factors which include the temperatures, the nature of the low boiling point liquid, and the area of the heat exchange surfaces and the moving member of the engine. The following are a few random numerical examples out of practically unlimited possible variations.

EXAMPLE 1

The pressures in both the evaporator and condenser chambers are below atmospheric pressure. Water under an air vacuum is the working liquid. Ambient temperature is about 30 degrees C. (86 degrees F.). The temperature of the water in the the evaporator chamber is 50 degrees C. (122 degrees F.). The temperature of the condenser chamber is 40 degrees C. (104 degree F.), which is intermediate between ambient and the evaporator chamber.

The 50 degree C. temperature in the evaporator chamber induces a water vapor pressure of 0.125 Kg/square cm in the chamber. This will result in an upward pressure upon movable wall 17a. The outside atmospheric pressure will result in a downward atmospheric pressure upon wall 17a or 1.036 Kg/square cm. The net force upon wall 17a is equal to the downward force minus the upward force upon the wall. This is equal to a net downward force of 0.911 Kg/square inch.

The 40 degree C. (104 degrees F.) in the condenser chamber induces an downward vapor pressure of 0.075 Kg/square cm upon wall 35c inside condenser chamber 35. The upward atmospheric pressure upon wall 35c is 1.036 Kg/square cm. The net upward force upon wall 35c is equal to the upward force minus the downward force. This is equal to a net upward force of 0.961 Kg/square cm.

In addition to the above vector forces, there is a mutual transmission of forces between the walls by rods 41. Wall 17a will therefore be subjected to a downward push of 0.911 Kg/square cm and an upward pull of of 0.961 Kg/square cm. by wall 35c. Wall 35c will be subjected to a upward push of 0.961 Kg/square cm and a downward pull by wall 17a of 0.911 Kg/square cm. This results in a net upward pull upon the walls of 0.05 Kg/square cm. The total upward force will depend upon the area of the walls. Assuming that each wall has an area of 1000 square cm the total upward force will be equal to 50 Kg. The work performed by each stroke is equal to force multiplied by distance of travel of the movable walls. The distance is determined by the slack of cable 33. Assuming a bellows expansion capability of 25 cm and a cable slack of 10 cm, the work performed per stroke is equal to 5 Kg meter. This will require 10 liters of vapor, under a pressure of 0.125 Kg/square cm. This will be generated by the vaporization of 0.82 gram of water per stroke and will require 431 thermal calories.

EXAMPLE 2

The pressures in the evaporator and the condenser chamber are above atmospheric pressure. Forane (R) 134A (tetrafluroethane) (F3CCH2F), an ozone sparring compound is the working low boiling point liquid. Ambient temperature is 21 degrees C. (70 degrees F.). The temperature of the liquid in the evaporator chamber is 37.8 degrees C. (100 degrees F.). The temperature of the condenser chamber is 30 degrees C. (86 degrees F.).

The temperature in the evaporator chamber induces an upward vapor pressure of 9.79 Kg/square cm upon wall 17a. The downward atmospheric pressure upon wall 17a is 1.036 Kg/square cm. The net force upon wall 17a is equal to the upward force minus the downward force upon the wall. This is equal to a net upward push of 8.75 Kg/square cm.

The 30 degree C. (86 degrees F.) in condenser chamber induces an downward vapor pressure of 7.87 Kg/square cm upon wall 35c inside condenser chamber 35. The upward atmospheric pressure upon wall 35c is 1.036 Kg/square cm. The net upward force upon wall 35c is equal to the downward force minus the upward force. This is equal to a downward push of 6.83 Kg/square cm.

In addition to the above vector forces, there is a mutual transmission of forces between the walls by rods 41. Wall 17a will therefore be subjected to an upward push of 8.75 Kg/square cm. and a downward push by its adjacent wall by a force of 6.83 Kg/square cm. Wall 35c will be subjected to a downward push of 6.83 Kg/square cm, and an upward push by its adjacent wall of 8.75 Kg/square cm. This results in a net upward push upon the walls of 1.92 Kg/square cm. The total upward force will depend upon the area of the walls. Assuming that each wall has an area of 1000 square cm the total upward force will be equal to 1920 Kg. The work performed by each stroke is equal to force multiplied by distance of travel of the movable walls. The distance is determined by the slack of cable 33. Assuming a bellows expansion capability of 25 cm and a cable slack of 10 cm, the work performed per stroke is equal to 192 Kg meter. This will require 10 liters of vapor, under a pressure of 9.979 Kg/square cm. This will be generated by the vaporization of 387.6 gram of Forane per stroke, and will require 81.5 thermal Kilo-calories.

EXAMPLE 3

The example illustrates the fact that when the temperature of the air is below freezing temperatures the engine can use the heat content present in ice cold bodies of water. The pressure in the evaporator is above atmospheric pressure, while the pressure in the condenser chamber is below atmospheric pressure. Forane (R) 134A (tetrafluroethane) (F3CCH2F), an ozone sparring compound is the working low boiling point liquid.

Ambient temperature is minus 40 degrees C. (minus 40 degrees F.). The temperature of a body of water is slightly about 0 degrees C. (32 degrees F.). The temperature of the evaporator chamber which is exposed to air is minus 30 degrees C. (minus 22 F.). The temperature of the condenser chamber which dips in the water is about 0 degrees C. (32 degrees F.).

The 0 degrees C. temperature in the evaporator chamber provides a downward vapor pressure of 2.99 Kg/square cm upon wall 17c. The upward atmospheric pressure upon wall 17c is 1.036 Kg/square cm. The net downward vector force upon wall 17c is equal to the downward force minus the upward force upon the wall. This is equal to a downward vector force of 1.95 Kg/square cm.

The minus 30 degree C. (86 degrees F.) in condenser chamber induces an upward vapor pressure of 0.87 Kg/square cm upon wall 35a inside condenser chamber 35. The downward atmospheric pressure upon wall 35a is 1.036 Kg/square cm. The net vector downward force upon wall 35a is equal to the downward force minus the upward force. This is equal to a net downward force of 0.166 Kg/square cm.

In addition to the above vector forces, there is a mutual transmission of forces between the walls by rods 41. Wall 17c will therefore be subjected to an downward push of 1.95 Kg/square cm. and a downward pull by its adjacent wall 17a by a force of 0.166 Kg/square cm. Wall 35a will be subjected to a downward push of 0.166 Kg/square cm, and an downward push by its adjacent wall 17c of a 1.95 Kg/square cm. This results in a total downward push upon the walls of 2.1 Kg/square cm. The total upward force will depend upon the area of the walls. Assuming that each wall has an area of 1000 square cm the total upward force will be equal to 2100 Kg. The work performed by each stroke is equal to force multiplied by distance of travel of the movable walls. The distance is determined by the slack of cable 33. Assuming a bellows expansion capability of 25 cm and a cable slack of 10 cm, the work performed per stroke is equal to 210 Kg meter. This will require 10 liters of vapor, under a pressure of 2.99 Kg/square cm. This will be generated by the vaporization of 169.7 gram of Forane per stroke, and will require 33.7 thermal Kilo-calories.

The number of strokes per unit of time in examples 1–3 depends on the amount and rate of heat transfer into the evaporator chamber, and out of the condenser chamber, and the Carnot efficiency of the engine. These are determined by the size of the heat exchange surfaces of the evaporator and the condenser chambers, the thermal conductivity of the surfaces and of the material in contact with the surfaces, and the temperature differential between the chambers. The optimal dimensions of the components should be determined by the energy needs of the users.

What is claimed is:

1. A heat engine, said engine includes at least one relatively hot evaporator chamber and one relatively cold condenser chamber,
   a low boiling point liquid in said chambers,
   means to obtain a temperature differential between said chambers, wherein said temperature differential results in a vapor pressure differential between the chambers,
   a movable wall in each of said chambers,
   said movable walls adapted to respond to inside and outside pressures on said walls,
   a linkage between said movable walls to obtain a transmission of vector forces from one of said movable wall to another,
   said movable walls placed in positions which cause the walls to include a transmission of opposing vector forces to each other, wherein the positions of said walls are determined by the resultants of said forces,
   means to fix the distance between said chambers to prevent a movement of said chambers towards and away from each other during the operation of said engine,
   a communication between said chambers,
   means to intermittently open and close said communication between the chambers, to intermittently change said resultant and said position of said walls,
   means to translate said changes in said positions of the movable walls to useful work,
   said opening of said communication adpated to allow a transfer of vapor from said evaporator chamber to said condenser chamber, to decrease the vapor pressure in said evaporator chamber and to re-condense said transferred vapor into a liquid,
   and means to return re-condensed liquid from said condenser chamber to said evaporator chamber.

2. The invention as described in claim 1 and including means to operatively associate the movement of at least one of said moving wall portion with said means of opening and closing said communication between the chambers.

3. The invention as described in claim 1 wherein said movable wall portions are part of a bellows.

4. The invention as described in claim 1 wherein said means to open and close said conduit consists of a swinging cover operatively connected to a moving member.

5. The invention as described in claim 1 wherein said relatively cold chamber is adapted to be placed at a lower level than said relatively hot chamber.

6. The invention as described in claim 5 and including a pump to return the liquid from the relatively cold chamber to the relatively hot chamber.

7. A low temperature-low pressure heat engine consisting of at least 2 chambers,
   a low boiling point liquid in said chambers,
   means to obtain a temperature differential between the chambers, wherein the temperature differential between the chambers results in a vapor pressure differential between the chambers,
   means to fix the distance between the chambers,
   a movable wall portion in each of said chamber, responding to the vapor pressures in the chamber,
   said movable walls positioned opposite each other and facing each other,
   a linkage between said movable wall portions to include a transmission of opposing vector forces from one said wall portion to another, wherein the positions of said walls are determined by the resultants of said forces,
   a conduit communicating between said chambers,
   means to intermittently close and open said conduit to intermittently change the vapor pressure differential between the chambers, wherein said changes in said vapor pressure differential changes said resultant and said position of said walls,
   means to translate said changes in the positions of the moving wall portions to useful work, said intermittent opening of said communication adapted to allow a transfer of vapor from said evaporator chamber to said condenser chamber, to decrease the vapor pressure in said evaporator chamber, and to re-condense said transferred vapor into a liquid, and means to return re-condensed liquid from said relatively cold chamber to said relatively hot chamber.

8. A low temperature heat engine, said engine includes a relatively hot chamber, a low boiling point liquid in said chamber, wherein said liquid exerts a vapor pressure in said hot chamber, at least one movable wall portion in said relatively hot chamber, said movable wall portion responding to pressures inside and outside said relatively hot chamber, a second relatively cold chamber, at least one movable wall portion in said relatively cold chamber, said movable wall portion responding to pressures inside and outside said relatively cold chamber, said movable wall portions positioned to face each other, means to fix the distance between said movable wall portions to obtain a transmission of forces between said wall portions, wherein said transmission moves said walls to a position which is determined by the resultant of said forces, means to fix the distance between said chambers to prevent a movement of said chambers away and towards each other during the operation of said engine, means to obtain a temperature differential between said chambers, to obtain a vapor pressure differential between the chambers, a communication between said chambers, means to intermittently open and close said communication between the chambers, to obtain intermittent changes in in the vapor pressures differential between the chambers, wherein said changes in said vapor pressure differential causes a change in said resultant and said position of said movable walls, means to translate said changes in said positions of said movable wall portions to useful work, said intermittent opening of said communication adapted to allow a transfer of vapor from said evaporator chamber to said condenser chamber, to decrease the vapor pressure in said evaporator chamber, and to re-condense said transferred vapor into a liquid, and means to return said re-condensed liquid from the relatively cold chamber to the relatively hot chamber.

* * * * *